United States Patent [19]

Bögli

[11] 4,078,765
[45] Mar. 14, 1978

[54] CINEMATOGRAPHIC APPARATUS

[75] Inventor: Rudolf Bögli, Yvonand, Switzerland

[73] Assignee: Bolex International SA, Ste-Croix, Switzerland

[21] Appl. No.: 689,549

[22] Filed: May 24, 1976

[30] Foreign Application Priority Data

May 23, 1975 Switzerland ..................... 006732/75

[51] Int. Cl.² .............................................. G03B 1/22
[52] U.S. Cl. ................................... 352/194; 352/155; 226/62
[58] Field of Search ............... 352/191, 192, 193, 194, 352/195, 196, 92, 176, 155; 226/62, 67, 68, 70, 71, 72, 73

[56] References Cited

U.S. PATENT DOCUMENTS

| | | | |
|---|---|---|---|
| 3,403,831 | 10/1968 | Lawson | 226/62 |
| 3,432,229 | 3/1969 | Freudenschusz | 352/176 |
| 3,515,470 | 6/1970 | Browder | 352/92 |
| 3,576,363 | 4/1971 | Theer | 352/191 |
| 3,694,065 | 9/1972 | Roth | 352/195 |

FOREIGN PATENT DOCUMENTS

| | | |
|---|---|---|
| 1,552,662 | 11/1968 | France. |
| 1,168,246 | 4/1964 | Germany. |
| 1,147,001 | 4/1969 | United Kingdom. |

*Primary Examiner*—Monroe H. Hayes
*Attorney, Agent, or Firm*—Fleit & Jacobson

[57] ABSTRACT

The invention is concerned with a motion picture projector or camera, with a claw for feeding the motion picture film, having at least one switch provided in one or several electric circuits of the motion picture projector or camera, which switch is controlled by said claw. An 8-mm motion picture camera in which a switch for various circuits of the camera is provided within the intercept of the claw is already familiar. In such an arrangement, contact elements of the switch are kept mutually in mesh by the claw while it engages the film or disengages from its perforations and if there is no film, the claw releases or opens these contact elements. Switching contacts of this type may be provided, e.g., in the electric circuits of the feed mechanisms or of the exposure control device of a motion picture camera. In this way, when no film is inserted, the batteries are unable to discharge.

In addition, a motion picture camera is known that has signals responding during operation and indicating that the film is being moved forward properly. Such a camera has, within the range of the film track, a switching contact that has been developed as part of a drag claw and is maintained by the film in an open position. When the motion picture film has already left the track, or when the film breaks, the contact closes and activates the signal.

On the other hand, the invention is intended to provide a motion picture projector or camera, in which switches may be activated by means of the claw when the film cannot be properly advanced. Also, the invention is designed to prevent any damage to the film or the accessories of the motion picture projector or camera, when the forward movement of the film does not take place in the proper manner.

Thus, the invention proposes that in a motion picture camera of the type described at the outset the gripping arm (arm of the claw) is mounted in such a way that it may be shifted, and preferably pivoted horizontally in the forward direction and that it is kept in its operating position by a detachable bracket, while the gripping arm functions as activating member of the switch.

8 Claims, 3 Drawing Figures

CINEMATOGRAPHIC APPARATUS

The invention accomplishes the following: when a force is applied to the claw that exceeds the force required to advance the film, the gripping arm shifts or pivots horizontally, while the gripping arm actuates the switch. A force of this level acts on the claw when, f.i., the end of the film has been firmly attached to the core of the film delivery spool and the film has run out. This force may also occur when the film is blocked in the area ahead of the claw, by some defect or similar cause. When the switch actuated by the claw is designed as contact breaker and is placed within the circuit of the electrical film movement mechanism, the forward motion of the film is interrupted immediately in a proper manner.

The invention is shown in the drawings in several embodiments, by way of examples.

Figure 1:
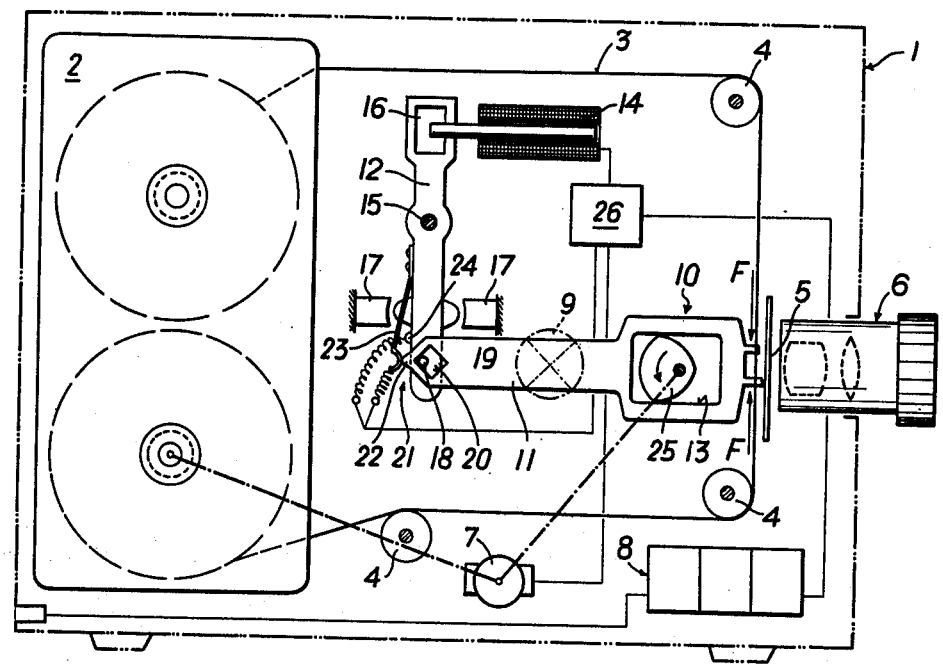
FIG. 1 is a schematic drawing of a motion picture projector, with a gripping arm that has been designed to control an electric switch.

In FIG. 1, the schematically drawn motion picture projector is denoted by 1. In cassette 2, the motion picture film 3 is stored; it runs in the form of a loop to the image aperture 5 over its guide rollers. The projection lens 6 is located in front of the image aperture 5. An electric motor 7 is provided to drive the film; this electric motor may be started by a push-button switch 8. The schematically suggested projection lamp 9 is also switched on by the operational switch 8.

For an intermittent forward movement of film 3, a claw 10 has been provided with a gripping arm 11 and a control lever 12. The gripping arm engages the perforation of film 3 with two gripping teeth. To execute the lift of engagement of the gripping arm, a claw cam 25 is mounted in recess 13. The claw cam 25 is driven continuously by electric motor 7.

The control of the lift of engagement of the gripping arm in the perforation of the film 13 is done by means of an electro-magnet 14 which is excited periodically to conform to the picture frequency selected, by the electronic array 26 that also controls the electric motor 7, and which pivots the control lever 12 horizontally around its center of rotation 15. For this purpose a permanent magnet 16 has been placed on the upper end of control lever 12. Resilient stops 17 are located on both sides of control lever 12 to limit the lift of engagement.

A mandrel 18, supporting gripping arm 11, is mounted on the lower end of control lever 12. In its operating position the gripping arm 11 touches mandrel 18 of control lever 12 under spring tension (spring leaf 23) within the area 19 of recess 20. Recess 20 has been designed so that its edges act as guides to gripping arm 11. These guides take effect when a force of a certain magnitude acts upon the teeth of the claw.

At the end of the forward or return movement of the film, the force F acts on the tooth of the claw, inasmuch as the film has been firmly attached to the film spool or to the take-up mandrel. The force (or the forces) F is considerably larger than the normal force needed in order to advance the film or to rewind it. This force F causes gripping arm 11 to pivot or rotate about the point of contact of the claw on cam 25. In doing so, the claw slides off the mandrel 18. This sliding-off causes the claw tooth to be extracted from the perforation of film 3 and acts, at least, for a brief time on switch 21. To throw this switch, gripping arm 11 has an adapter 22 that releases one contact of switch 21 that consists of spring leaf 23. This closes a control circuit of the electronic array 26 for the driving mechanisms via contact 24 mounted on the control lever 12. In this way, the driving mechanism (electric motor 7, claw cam 23) is switched off immediately. Likewise, the supply of current to electric magnet 14 is interrupted.

Figure 2:
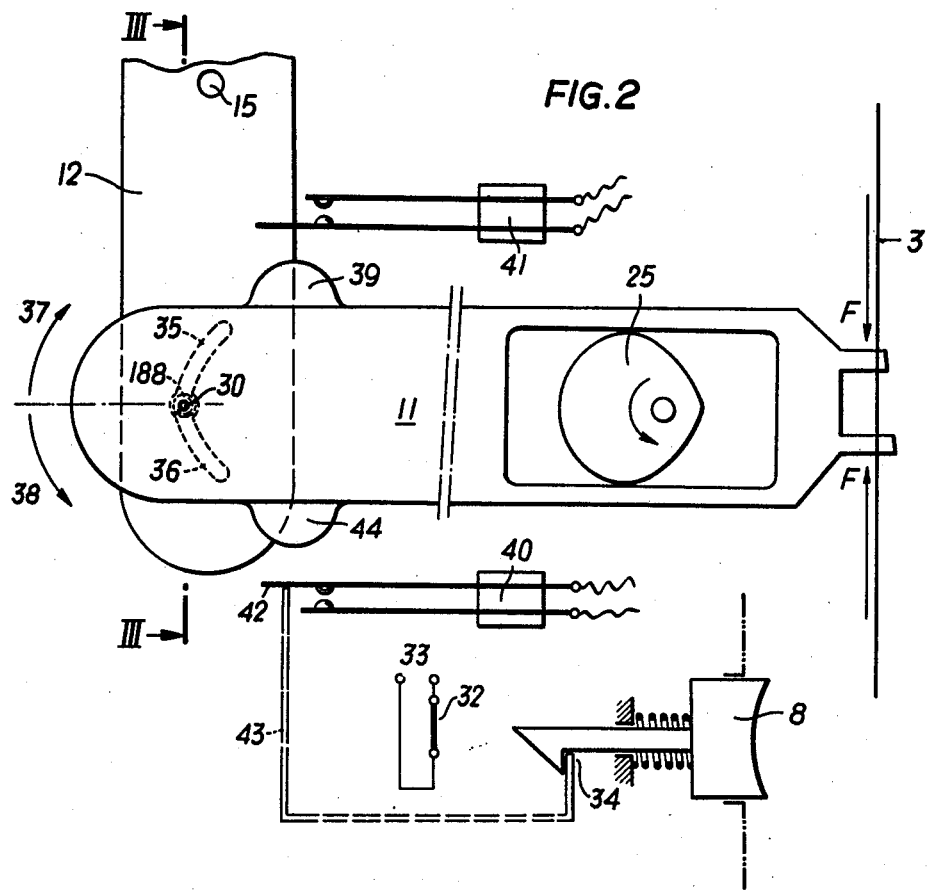
FIG. 2 shows an additional form of the gripping arm.
Figure 3:
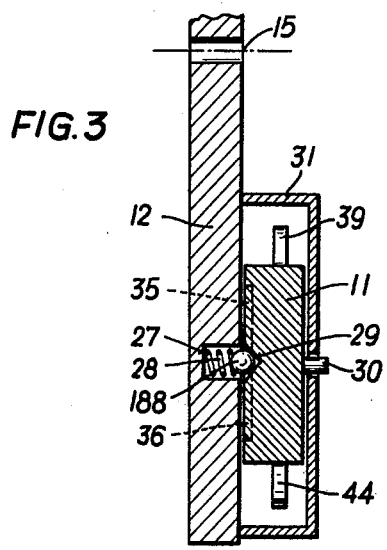
FIG. 3 is a section along line III—III in FIG. 2.

In FIG. 2 and/or 3, an additional design for the support of gripping arm 11 on control lever 12 is shown. FIG. 3 shows a section along line III—III in accordance with FIG. 2.

Within a bore-hole 27 of control lever 12, a ball 188 has been placed. Due to the tension of a spring 28, this ball projects from bore-hole 27. Gripping arm 11 also has a bore-hole 29, for resting on ball 188, and an axle stub 30 which is supported within a frame 31 mounted on control lever 12. The engagement lift of gripping arm 11 is controlled by continuously-driven claw cam 25. The driving mechanisms for control lever 12 and for cam 25 can generally be shown in FIG. 1. The driving mechanisms not shown are activated by push-button 8. To this end, a switch contact 32 has been coupled with push-button 8. The switch contact 32 is connected via terminals 33, e.g., with electronic array 26, in accordance with FIG. 1. A detachable stop lug 34 keeps push button 8 in its operating position after having been actuated.

When a force F that exceeds the force needed by gripping arm 11 to advance the film acts on the teeth of this gripping arm, the latter is pivoted out of its operating position on control lever 12. The gripping arm 11 moves in this case along either one of the guide grooves 35, 36, and around the point where control cam 25 touches gripping arm 11. The guide grooves 35, 36 being at area 29 of the support of ball 188 in gripping arm 11; their depth is made less than the depth of the bore hole in area 29. As a result, when gripping arm 11 will only pivot out of its operating position by reference to control lever 12 when force F is great enough to press ball 188 into bore hole 27 of control lever 12 against the tension of spring 28, by the difference bbetween the bottoms of grooves 35, 36 and the depth of bore hole within area 29. The direction of the possible horizontal pivot of gripping arm 11 in responding to force F has been indicated by arrows 37, 38.

One radial cam 39, 44 each has been mounted on the upper and lower surfaces of gripping arm 11; these radial cams activate, when gripping arm 11 pivots in the direction of arrow 38, a switching contact 40; when the gripping arm pivots in the direction of arrow 37, they activate switching contact 41. These switching contacts may be arranged advantageously in control circuits of the electronic array 26, as shown in FIG. 1. The equipment may be developed, f.i., in a way that throwing the switching contacts 40 and/or 41 immediately switches off the projector drive (not shown). The contact tongue 42 of switching contact 49 may be connected mechanically (plunger 43) with stoplug 34 of push-button 8. When control cam 40 acts on the contact tongue 42, stoplug 34 of push-button 8 is released immediately by plunger 43, and the switching contact 32 which, as described above, has likewise been provided within the control circuit of the electronic array of the projector is opened, thereby switching off the motion picture projector.

Switching contact 41 may also be used to control the projector. Another possibility is to have the switching contacts controlled by gripping arm 11 change the direction in which the film moves which may be desirable after an entire motion picture film has been run off.

In addition, the bracket of the gripping arm in its operating position may take hold on the control lever by at least one permanent magnet mounted on one of those structural elements. In accordance with this embodiment of the invention, the force F will have to exceed or cancel the attraction of the magnet in order to produce the horizontal pivot of the gripping arm and to activate the switches or to release the locking mechanism of the operational switch or similar device.

This means that the invention has created advantageously a motion picture projector or camera, in which a reliable switching of the mechanism driving the motion picture film is achieved as needed. It is possible also to switch off the projection lamp by a switch (not shown) at the same time as the driving mechanism is switched off or reversed.

When this arrangement is used in a motion picture camera, it is possible by means of the claw to inactivate certain devices that are required for taking pictures, such as exposure meter, film drive, and electromechanical rangge finder. Beyond that, the advantage of the invention consists in the fact that the control of electric and/or electro-mechanical equipment or of similar devices takes place by means of mechanisms of the motion picture camera or projector interacting directly with the picture carrier, whereby considerably increasing the dependability of the camera or projector.

To conclude, we want to point out that the detachable claw bracket does not have to be mounted on control lever 12. The support which can be rotated and shifted longitudinally, may be installed directly on the instrument panel or on a similar part. The lift of engagement of the claw may be controlled also by an additional cam mounted on the shaft of claw cam 25. The claw may also be designed as a pawl ("Klinkengreifer") the transverse movement of which is controlled by the film.

I claim:

1. In a motion picture projector or camera of the type having a claw for feeding motion picture film and at least one switch arranged in the electrical circuits of the projector or camera the improvement comprising:
   a gripping arm having one end affixed to said claw and being releasably pivotally mounted about an axis to permit movement when said claw is driven to feed the film;
   switch actuating means integrally formed with said gripping arm for actuating said at least one switch upon a specific movement of said gripping arm, and
   control means connected to said gripping arm and arranged for controlling the amount of lift of said claw, whereby when a force acts on said claw in excess of a force required to perform said film feed operation said gripping arm is moved such that it is released from said axis thereby permitting said switch actuating means to actuate said at least one switch.

2. The apparatus of claim 1 wherein said axis is located in an aperture in said gripper arm and is biased against a predetermined inner edge of said aperture.

3. The apparatus of claim 1 wherein said control means comprises a control arm for transferring movement to said gripping arm, and wherein one contact of said switch is affixed to said control arm and said switch actuating means is formed at the end of said gripping arm.

4. The apparatus of claim 3 further comprising an electro-magnet energized in conjunction with the film drive for alternately attracting the free end of said control arm to control said amount of lift of said control arm.

5. The apparatus of claim 1 wherein said gripping arm and control means are releasably attached by detent means.

6. The apparatus of claim 5 wherein said detent means comprises a spring-loaded ball mounted on said control means and which when released is caused to ride in opposing arcuate slots located in said gripping arm.

7. The apparatus of claim 6 wherein said switch actuating means comprises upstanding tabs located at one end of said gripping arms for contacting said at least one switch means when said gripping arm is released from said control arm.

8. The apparatus of claim 7 further comprising a linkage means connected to be actuated by said switch actuating means for releasing a main power switch in said projector or camera when said at least one switch is actuated.

* * * * *